April 14, 1942. A. L. MEDENWALD Re. 22,069
MEANS FOR SUSPENDING AND MOVING A PLATFORM OR THE LIKE
Original Filed April 11, 1938
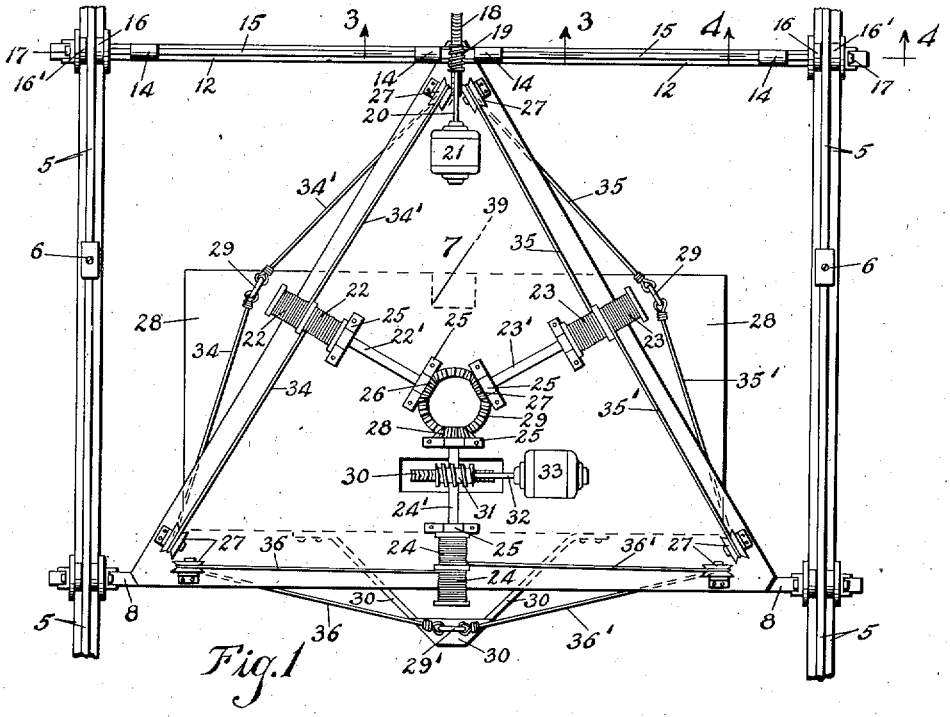
Fig. 1
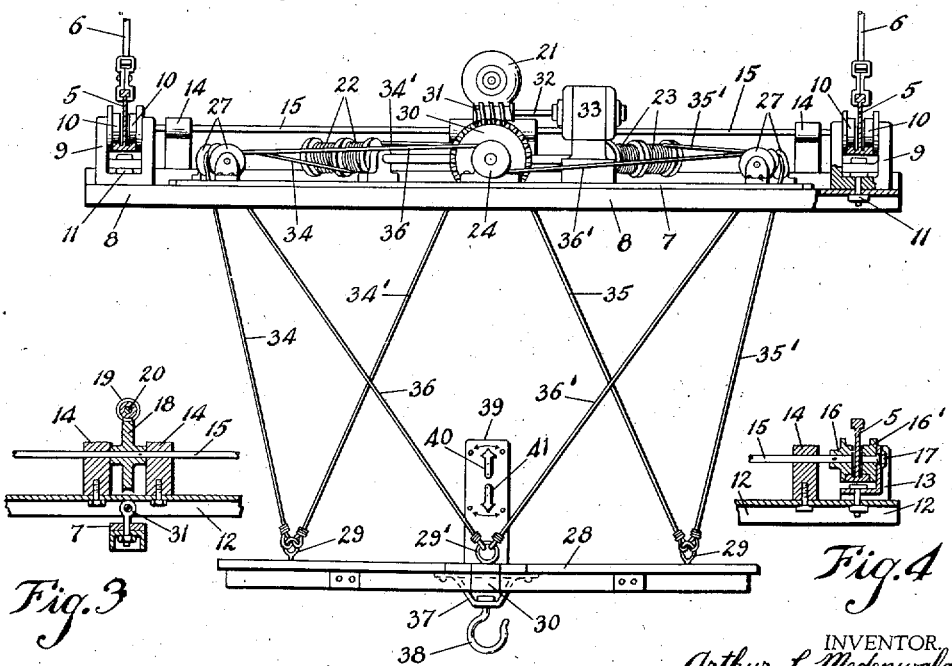
Fig. 3
Fig. 4
Fig. 2
INVENTOR.
Arthur L. Medenwald
BY
ATTORNEY.

Reissued Apr. 14, 1942

Re. 22,069

UNITED STATES PATENT OFFICE 22,069

MEANS FOR SUSPENDING AND MOVING A PLATFORM OR THE LIKE

Arthur L. Medenwald, Los Angeles, Calif., assignor, by mesne assignments, to The Cleveland Crane & Engineering Company, Wickliffe, Ohio, a corporation of Ohio Original No. 2,164,128, dated June 27, 1939, Serial No. 201,283, April 11, 1938. Application for reissue April 19, 1941, Serial No. 389,480

16 Claims. (Cl. 304—9)

This invention relates to means for suspending and moving a platform or the like, such as is used by workmen, operators, and others, where it is necessary for them to be raised and lowered to different heights, and to be moved back and forth to different positions, in connection with the work or thing they are doing.

Among the salient objects of this invention are:

To provide means for suspending and moving a work platform, cage, or the like, by means of cables which are so positioned and connected that they not only serve as the suspending means but as guy-wires to prevent lateral movement or swinging, and which can be raised and lowered simultaneously and uniformly, without changing their functioning angles or connections.

To provide a mechanism of the character referred to having a three point cable suspension, with means for simultaneously and uniformly taking up and letting out said cable, whereby no tilting or swinging of said platform or cage is permitted, thus making it most practical and efficient for use by those who must operate lights or cameras, or both, from an elevated platform or cage, and where changes in their operating positions, or elevations, are necessary.

To provide in such a mechanism electrically controlled and operated means which can be readily and conveniently manipulated by the workmen on said platform, whether for movement back and forth horizontally, or up and down for different elevations, and may be required by the job being done.

To provide in connection with such a mechanism suitable overhead rails or track members or traveling crane from which said mechanism is suspended and along which it can be moved at will, and at any desired elevation thereunder within the capacity provided for; and, in general, to provide a practical, efficient and convenient mechanism for suspending, raising and lowering, and moving back and forth, a stabilized, suspended work platform, cage, or other support, with electrical control conveniently positioned for those working thereon.

In order to more fully explain my invention, one practical embodiment thereof is shown on the accompanying sheet of drawings, which I will now describe.

Figure 1 is a plan view looking down upon a mechanism embodying the invention;

Figure 2 is an end view of said mechanism;

Figure 3 is an enlarged detail view, in section, taken on line 3—3 of Fig. 1; and Figure 4 is a similar view taken on line 4—4 of Fig. 1.

Referring now more in detail to the drawing, the rail or track members are designated 5, 5, and are shown suspended from rods, 6, 6, and should be suitably braced or anchored so as to constitute a rigid track way or tram rail structure for supporting the mechanism constituting the invention of the present application.

The invention proper includes a triangular body structure, as 7, in the present showing, across the rear under side of which is a channel member 8, extended at its opposite ends and having mounted thereon two U-shaped bearing members, 9, 9, in each of which are mounted two pairs of cooperating flanged wheels, 10, 10, at opposite sides of the member 5, as clearly indicated in Fig. 2. Said U-shaped bearing members 9, 9, are bolted to said channel member 8 by the bolts 11, 11.

Across the forward end of said triangular structure 7 is another channel member 12, on the opposite ends of which are mounted angle bearing members, as 13, 13, and along which are also mounted shaft bearing members, as 14, 14, through which, above said channel member 12, is an operating shaft 15, on the opposite ends of which are keyed two flanged wheels, as 16, 16, running on the inner sides of the track member 5, which will be seen in enlarged form in Fig. 4. On the outer sides of said track members 5, 5, are other flanged wheels 16', 16', on stub shafts 17, 17, in said angle bearing members 13, 13, shown in detail in the sectional view in Fig. 4.

Mounted in the middle of the shaft 15, is a worm gear 18, driven by a worm 19, on shaft 20, from a motor 21, mounted on the triangular member 7, as seen in the plan view, Fig. 1, whereby said shaft 15 is driven for moving said structure back and forth on the track members 5, 5, said motor being of the reversible type.

Mounted on said triangular body 7, are three pairs of suitable cable drums, as 22, 23 and 24, on drive shafts 22', 23' and 24' in suitable bearings, all of which are designated 25, 25, said shafts having on their inner or converging ends beveled gears 26, 27 and 28, all three of which are in mesh with a beveled gear 29, operating as a common drive member between said beveled gears 26, 27 and 28. Mounted on shaft 24' is a worm gear 30, driven by a worm 31, on shaft 32, from motor 33. Thus from motor 33, also a reversible motor, said drums 22, 23 and 24 are simultaneously and uniformly driven in either direction to simultaneously take up and let out three pairs of suspending cables, said cables being designated, respectively, 34—34' from drums 22, 35—35' from drums 23, and 36—36' from drums 24, as will be seen in Fig. 1. Said cables run over suitable guide pulleys, as 27, 27, arranged at the three corners of the body 7, as clearly indicated in Figs. 1 and 2, and in such a way that said cables are guided and directed downwardly below the body 7, where they are attached at three triangularly spaced locations to a work platform, designated 28, the attaching means for said cables being three eyelets, as 29, 29 and 29', the eyelet 29' being mounted on an extension 30, on the rearward edge of said platform structure, as seen in light broken lines in Fig. 1, whereby said eyelets are equally spaced.

The front or small end of the body member 7 is suspended under the cross channel member 12, by an eye-bolt 31, as seen in Fig. 3.

In order that the apparatus may be used for lifting other things, I have shown on the underside of the work platform 28, a yoke 37, to which is connected a swivel hook 38, whereby a load of any kind can be suspended from said hook, with the stabilization furnished by the cable suspended platform 28. This would make the apparatus usable in foundry work and the like.

I have also shown on the work platform 28, a supporting standard 39, on which is mounted the controls for the motors. These controls are indicated by the control levers 40 and 41, for the motors 21 and 33, as will be understood, said controls being convenient for the operators or workmen on said work platform or cage.

The heart of the invention is in the novel manner in which the work platform 28 is suspended by means of the combination suspension and guy-wire cables, whereby said work platform and its load can be raised and lowered at will through the motor 33, and its driving connections whereby all three of the double drums are simultaneously and uniformly operated. This novel cable system, with its operating apparatus, provides a stabilized work platform or support which can be raised and lowered at will, and which can be moved horizontally back and forth to any desired position, as may be required for the best results. It will be understood, of course, that there is sufficient weight on said work platform to keep said cables taut and that the angles of said cables co-operate to prevent any swinging movement of the work platform as it is raised and lowered, or as it is moved horizontally to different positions.

While I have shown and described one practical embodiment of the invention for explanatory purposes, I am aware that many changes in the details of construction and arrangement can be made in the showing made without departing from the spirit of the invention, and I do not, therefore, limit the invention to this showing except as I may be limited by the hereto appended claims.

I claim:

1. In combination with a supporting structure having travel ways, and a movable structure mounted thereon to travel on said ways, a work platform suspended from said movable structure by cables, said cables running from three operating drums triangularly positioned on said structure, with means for simultaneously operating the same to take up and let out said cables, said cables being angularly extended inwardly to three triangularly positioned attaching members on said work platform below, whereby said cables operate as combination suspension and guy-wire cables to raise and lower said work platform and to prevent swinging movement thereof.

2. In combination with a supporting structure having travel ways thereon and a movable structure mounted thereon to travel on said ways, a work platform suspended thereunder from said movable structure, three cable drums operatively mounted in triangular positions on said movable structure, cables from said drums extended downwardly and inwardly to said work platform, whereby to have angular guy-wire positions from the movable structure to said work platform, a motor with connections for simultaneously operating said cable drums to take up and let out said cables, and control means therefor.

3. Means for suspending a work platform from an overhead structure, including three double cable drums triangularly spaced on said overhead structure, cables from said drums extended downwardly and inwardly to said work platform, a work platform having three attaching members triangularly spaced thereon to which said cables are attached, the triangle of said attaching members being smaller than the triangle of said cable drums, motor means for operating said drums, control means for said motor means whereby said cables can be simultaneously and uniformly let out and taken up to raise and lower said work platform, said cable connections being adapted to function as combination suspension and guy-wire cables to prevent swinging movement of the work platform.

4. Means for suspending a work platform from an overhead movable structure, which means includes three double cable drums triangularly spaced on said movable structure, two cables from each drum attached to be simultaneously let out and taken up as said drum is driven, a motor with operative connections for driving said double cable drums simultaneously, a work platform under said movable structure, said cables being connected with said work platform at three triangularly spaced positions thereon, the triangle formed by said three positions being smaller than the triangle formed by the positions of said cable drums, whereby said cables are extended downwardly and inwardly at angles to serve as guy-wires as well as suspension cables, and control means on said work platform for controlling the operation of said motor to raise and lower said platform at will.

5. In an apparatus of the character shown and described, a structure having a supporting trackway, a carrying structure movably mounted thereon, a plurality of double cable drums mounted on said carrying structure, a work platform under said carrying structure having attaching means for cables, double cables from said drums extended downwardly and inwardly from opposite corners of said carrying structure to each attaching means on said work platform, and at angles to serve as guy-wires to prevent swinging, as well as suspending cables power means with operative connections for simultaneously driving said double cable drums to take up and let out said cables, and control mechanism for said power means.

6. In an apparatus of the character referred to, a supporting structure, a plurality of double cable drums mounted thereon, power means for operating said drums simultaneously and uniformly to take up and let out cables wound thereon, cables from said drums running over pulleys triangularly spaced, a member for supporting a load under said supporting structure, said cables being extended to and attached to said member at three triangularly spaced positions, whereby said cables operate as combination suspension cables from said supporting structure and as guy-wires to said member, whereby to prevent lateral swinging as said member is raised and lowered, and control means for controlling the operation of said power means at will.

7. In an apparatus of the character referred to, a structure having a supporting trackway, a carrying structure movable thereon, a plurality of drums mounted on said carrying structure, a work platform under said carrying structure having a plurality of attaching means for supporting cables, two cables from each drum extended downwardly and inwardly from opposite outer positions on said carrying structure to each attaching means on said work platform and at angles to serve as combination suspending cables and guy-wires to prevent lateral swinging in any direction, power means with operative connections for simultaneously driving all of said drums to take up and let out said cables, to raise and lower said work platform without lateral swinging, and control means for said power means.

8. In apparatus of the character referred to, a supporting structure, three pairs of cables carried by said supporting structure, said cables being adapted to be operatively connected to a load in such a manner that the respective cables of each pair are angularly disposed to each other and the respective pairs of cables lie in intersecting planes.

9. In apparatus of the character referred to, a movable supporting structure, three pairs of cables carried by said supporting structure, said cables being adapted to be operatively connected to a load at spaced points in such a manner that the respective cables of each pair are angularly disposed to each other and the respective pairs of cables lie in non-parallel, generally vertical planes, and means for simultaneously letting out and taking up the respective cables of each pair.

10. In apparatus of the character referred to, a movable supporting structure, three pairs of cables carried by said supporting structure with the respective cables of each pair spaced relative to each other, said cables being adapted to be operatively connected to a load at three spaced points with the respective cables of each pair connected at the same point, said connections being such that the respective cables of each pair are angularly disposed to each other and the respective pairs of cables lie in generally vertically intersecting planes, and means for simultaneously letting out and taking up the respective cables of each pair.

11. In apparatus of the character referred to, a movable supporting structure, a member to be supported, means comprising three pairs of cables for suspending said member from said supporting structure, said cables being operatively connected to said supporting structure and to said member at spaced points and in such a manner that the planes within which each pair of cables lie intersect each other and the respective cables of each pair are angularly disposed to each other, and means for simultaneously letting out and taking up the respective cables of each pair.

12. In apparatus of the character referred to, a movable supporting structure, a member to be supported, means comprising three pairs of cables for suspending said member from said supporting structure, said cables being operatively connected to said supporting structure and to said member at spaced points and in such a manner that the respective cables of each pair are angularly disposed to each other and the respective pairs of cables lie in substantially vertical, non-parallel planes, and means for simultaneously letting out and taking up the respective cables of each pair.

13. In apparatus of the character referred to, a movable supporting member, a supported member, means comprising three pairs of cables for suspending said supported member from said supporting member, means for operatively connecting said cables to said members in such a manner that the respective cables of each pair are angularly disposed to each other and the respective pairs of cables lie in intersecting planes, and means for simultaneously letting out and taking up the respective cables of each pair.

14. In apparatus of the character referred to, a movable supporting member, a supported member, means comprising three pairs of cables for suspending said supported member from said supporting member, means for operatively connecting the respective cables of each pair to one of said members at spaced points, means for operatively connecting the other ends of said cables to the other of said members so that the respective ends of each pair are connected to said supported member at substantially the same point but spaced from the points at which the other pairs of cables are connected, and means for simultaneously letting out and taking up the respective cables of each pair.

15. In apparatus of the character referred to, an overhead trackway, a supporting member movably supported on said trackway, a supported member, means comprising three pairs of cables for suspending said supported member from said supporting member, means for operatively connecting said cables to said members in such a manner that the respective cables of the respective pair are angularly disposed to each other and each pairs of cables lie in intersecting planes, and means for simultaneously letting out and taking up the respective cables of each pair.

16. In apparatus of the character referred to, an overhead trackway, a supporting member movably supported on said trackway, a supported member, means comprising three pairs of cables for suspending said supported member from said supporting member, means for operatively connecting the respective cables of each pair to one of said members at spaced points, means for operatively connecting the other ends of said cables to the other of said members so that the respective ends of each pair are connected to said supported member at substantially the same point but spaced from the points at which the other pairs of cables are connected, and means for simultaneously letting out and taking up the respective cables of each pair.

ARTHUR L. MEDENWALD.